United States Patent [19]
Linderman

[11] 3,815,725
[45] June 11, 1974

[54] CONVEYOR CHAIN APPARATUS

[76] Inventor: Shayne T. Linderman, Newdale, Idaho 83436

[22] Filed: Aug. 8, 1972

[21] Appl. No.: 278,755

[52] U.S. Cl. ............................................. 198/195
[51] Int. Cl. ............................................ B65g 15/30
[58] Field of Search................... 198/195, 189, 174; 74/245 R, 245 C

[56] References Cited
UNITED STATES PATENTS
586,956   7/1897   Barker ............................ 74/251 R
3,099,346   7/1963   Mass ................................... 198/174
3,392,819   7/1968   Waite .................................. 198/195

Primary Examiner—Richard E. Aegerter

[57] ABSTRACT

An endless conveyor chain with a plurality of permanently secured links and rods, a plurality of replaceable links and rods secured together by snap ring means, and a plurality of links and rods provided with push bar members thereon, all of said rods having enlarged diameter portions for contact by a drive sprocket.

5 Claims, 5 Drawing Figures

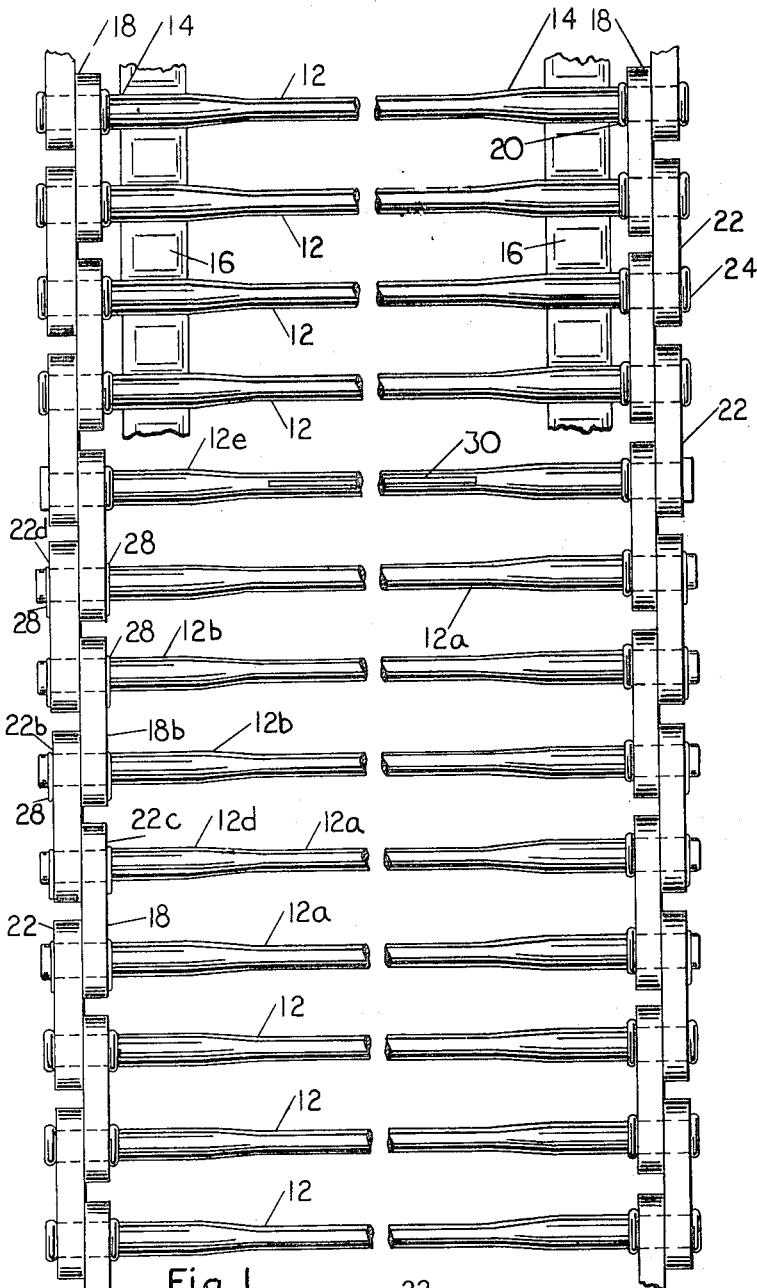
Fig. 1
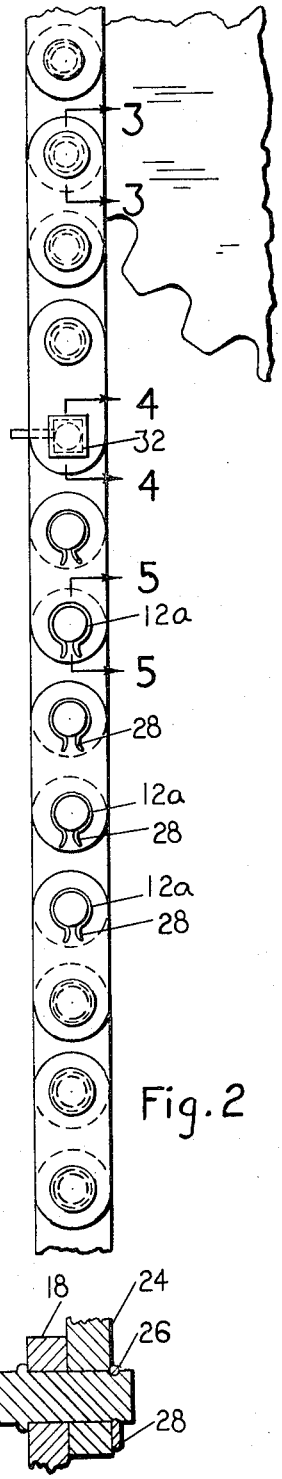
Fig. 2
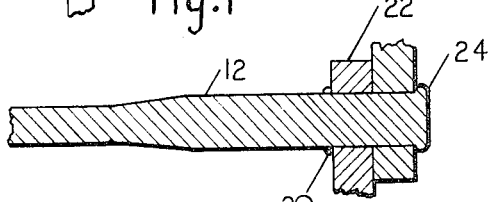
Fig. 3
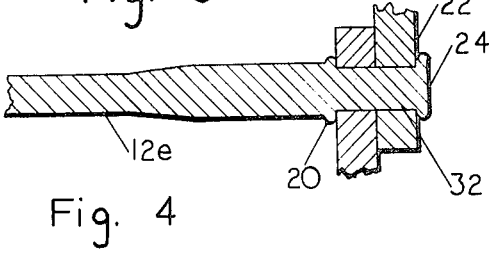
Fig. 4
Fig. 5
INVENTOR: Shayne T. Linderman
By Lawrence J. Wester
Attorney

CONVEYOR CHAIN APPARATUS

The present invention relates to a conveyor chain apparatus of simple and rugged construction and provided with readily replaceable links and rods to shorten the overall length of the conveyor chain when necessary due to wear.

It is another object of the present invention to provide a conveyor chain which has a longer serviceable life by providing the lateral cross rods extending between the links with an increased diameter area adjacent the portion thereof that comes into contact with the driving sprocket to increase the wear life thereof.

It is another object of the present invention to provide a conveyor chain with a series of master links and lateral cross rods which are designed for easy removal thereof and replacement so that when a conveyor chain becomes unduly long from wear, it is only necessary to replace the master links and cross rods with new ones, to thus increase the serviceable life of the conveyor chain.

It is still another object of the present invention to provide a conveyor chain that has replaceable cross rods and connector links to compensate for wear of the conveyor chain due to the wearing away of the material which causes slippage on the drive sprocket and sagging of the elongated conveyor chain by providing means to shorten the chain or replace the links and the cross rods, or both, as necessary.

It is another object of the present invention to provide for more economical production of the lateral rod members in the conveyor chain by making them of simple configuration so as to require less machining of grooves therein.

It is still another object of the present invention to provide a conveyor chain with a plurality of cross rods and links in which the cross rod is provided with a square configuration where it is secured to the links so as to prevent the rod from rotating when it is pushing or moving a heavy load on the conveyor chain.

It is another object of the present invention to provide a conveyor chain with straight links and not of the offset shape.

Various other objects and advantages of the present invention will be readily understood when considered in connection with the accompanying drawings forming a part thereof and in which:

FIG. 1 is a top plan view of the conveyor chain embodied in the present invention;

FIG. 2 is a side view of the conveyor chain shown in FIG. 1;

FIG. 3 is a fragmentary detailed view in sections of one of the fixed rods and connectors embodied in the conveyor chain taken along the lines 3—3 of FIG. 2;

FIG. 4 is a fragmentary detailed view of one of the rods in the conveyor chain having a square configuration where secured to the connectors taken along the lines 4—4 of FIG. 2; and FIG. 5 is a section taken along the lines 5—5 of FIG. 2 illustrating a replaceable cross rod and connector link embodied in the present invention.

Referring to the drawings, the reference numeral 10 generally designates the conveyor chain of the present invention, which is provided with a plurality of cross bars or rods with connecting links.

The conveyor chain is provided with a plurality of laterally extending rods or cross bars 12, preferably disposed in groups of five in a row at spaced intervals throughout the conveyor chain. The rods 12 are circular in cross section and are provided with enlarged diameter portions 14 adjacent their outer ends so as to contact the drive sprocket wheels 16 adjacent these enlarged portions to increase the serviceable life of the chain since it is the contact with the sprocket wheels which wears down the rod more quickly than in other areas. The rods 12 are secured to links 18 disposed adjacent a forged stop ring 20 adjacent the outer end of the enlarged portions 14. Each link 18 is used to connect two adjacent rods together. An outside link 22 is disposed on each rod 12 adjacent the inside link 18, as best seen in FIG. 1, and an outside forged stop ring 24 is provided on the links 12 and is disposed adjacent the outer side of the links 22 so as to permanently secure the links 18 and 22 to the rods 12. The links 18 and 22 are formed with flat surfaces so as to provide a minimum of machining thereof.

The conveyor chain is also provided with a plurality of cross rods designated 12a which are identical to the rods 12 except that they are not provided with an outer stop ring, but instead have a small circumferential groove therein indicated at 26 in FIG. 5. Two adjacent rods 12a are held together by the inner and outer links 18 and 24 and a snap ring 28 is disposed in the groove 26 so that these rods 12a may be readily removed from the conveyor chain when necessary and the chain may be shortened due to wear of the material.

When it is desired to remove a rod or rods 12a from the chain three of the snap rings 28 are removed from their respective grooves and the rod 12a or rods 12a is moved to the left until the right end thereof is clear of the holes in the links 22 and 24 on the right side of the conveyor chain, when looking at FIG. 1. Since the left side of the rods 12a are provided with similar grooves 26 with retaining rings 28 adjacent each side of the links 18 and 20 the rods 12a can be moved all the way to the left until the stop 20 is clear of the holes in the link at the right and the rod 12a can then be moved to the right and out of the links 18 and 22 on the left hand side of the conveyor.

Assuming the total wear of the conveyor chain necessitated shortening the conveyor chain by removing two rods 12a the chain could be shortened by removing the two rods designated 12b with link designated 18b and link designated 22b could also be removed so that link designated 22c could be moved next to outside link 22d for holding rod designated 12d.

The conveyor chain is further provided with permanently affixed rods designated 12e and similar in structure to the rods 12 except they are provided with a laterally extending push member 30 adjacent the mid portion thereof, as best seen in FIGS. 1 and 4. It will further be noted that the portion of the rod 12e adjacent the outside or between the stop rings 20 and 24 has a square cross section designated 32 and the holes in the links through which the rod 12e extends is square. This prevents the rod 12e from rotating by the weight of the load pressing against the pusher member 30 as the load is being moved along the conveyor.

Thus, from the foregoing description it is apparent that the present invention provides a novel conveyor chain device having a plurality of permanent rods and links joined together, another plurality of replaceable rods in the conveyor chain to shorten the chain when necessary due to wear, and a plurality of rods having pusher members for conveying the material along the conveyor at a rapid pace.

Inasmuch as various changes may be made in the relative arrangement, form and location of the parts without departing from the invention, it is not meant to limit the scope of the invention except by the appended claims.

What is claimed is:

1. A conveyor chain comprising a plurality of lateral rods with links connecting two adjacent rods together along their opposite ends, all of said rods having enlarged diameter sections adjacent their opposite ends, one group of rods having stop rings on both sides of said links to permanently secure the rods and links together, and another group of rods having snap ring means on the inner side of said links and the outer rods ends on the outer side of said links to permit said rods to be removed from said chain to compensate for wear, and another group of rods is provided thereon having laterally extending pusher means thereon.

2. The chain of claim 1 wherein said another group of rods has a square cross section thereon where it extends through the apertures in said links.

3. The chain of claim 1 wherein said snap rings means includes two snap rings disposed in grooves on inner side of said another group of rods, and a snap ring disposed in a groove on the outer side thereof.

4. The chain of claim 3 wherein a third group of rods has a square cross section thereon where it extends through the apertures in said links.

5. The conveyor chain of claim 3 wherein said links have straight parallel extending sides.

* * * * *